(12) United States Patent
Lee et al.

(10) Patent No.: US 12,549,342 B2
(45) Date of Patent: Feb. 10, 2026

(54) MANAGEMENT APPARATUS FOR QUANTUM KEY, AND MANAGEMENT METHOD QUANTUM KEY

(71) Applicant: KOREA INSTITUTE OF SCIENCE & TECHNOLOGY INFORMATION, Daejeon (KR)

(72) Inventors: Chan Kyun Lee, Daejeon (KR); Yong Hwan Kim, Daejeon (KR); Kyu Seok Shim, Daejeon (KR); Won Hyuk Lee, Sejong-si (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 125 days.

(21) Appl. No.: 18/522,533

(22) Filed: Nov. 29, 2023

(65) Prior Publication Data
US 2024/0340170 A1    Oct. 10, 2024

(30) Foreign Application Priority Data
Apr. 10, 2023    (KR) .................. 10-2023-0046847

(51) Int. Cl.
    *H04L 9/08*    (2006.01)
(52) U.S. Cl.
    CPC ................. *H04L 9/0852* (2013.01)
(58) Field of Classification Search
    CPC .... H04L 9/0852; H04L 9/0827; H04L 9/0855
    See application file for complete search history.

(56) References Cited

U.S. PATENT DOCUMENTS

| | | | |
|---|---|---|---|
| 2006/0062392 A1* | 3/2006 | Lee | H04L 9/0852 380/278 |
| 2017/0237559 A1* | 8/2017 | Yuan | H04L 9/0852 380/283 |
| 2020/0358606 A1* | 11/2020 | Zhao | H04L 9/12 |
| 2022/0294616 A1* | 9/2022 | Parry | H04L 9/0855 |

FOREIGN PATENT DOCUMENTS

| | | |
|---|---|---|
| EP | 4060931 | 9/2022 |
| JP | 2010-041387 | 2/2010 |
| JP | 2015-142339 | 8/2015 |
| JP | 2020-501413 | 1/2020 |
| KR | 10-2022-0049197 | 4/2022 |

OTHER PUBLICATIONS

Japanese Notice of Allowance dated Jul. 11, 2024 issued in Application No. 2023-201566.
Extended European Search Report dated Apr. 11, 2024 issued in Application No. 23212851.2.
Article entitled, "The Engineering of a Scalable Multi-Site Communications System Utilizing Quantum Key Distribution (QKD)", arxtv.org, Cornell University Library, Piotr K Tysowski et al., dated Dec. 7, 2017: 34 pages.

* cited by examiner

*Primary Examiner* — Baotran N To
(74) *Attorney, Agent, or Firm* — KED & ASSOCIATES, LLP

(57) ABSTRACT

The present disclosure relates to a scheme of managing and operating a multi-class quantum key provided in a unit of a quantum key length in a quantum cryptography communication network.

10 Claims, 5 Drawing Sheets

[quantum key management apparatus]

MANAGEMENT APPARATUS FOR QUANTUM KEY, AND MANAGEMENT METHOD QUANTUM KEY

CROSS-REFERENCE TO RELATED APPLICATION(S)

This application is based on and claims priority under 35 U.S.C. 119 to Korean Patent Application No. 10-2023-0046847, filed on Apr. 10, 2023, in the Korean Intellectual Property Office, the disclosure of which is herein incorporated by reference in its entirety.

BACKGROUND OF THE INVENTION

1. Field of the Invention

The present disclosure relates to a scheme of managing and operating a multi-class quantum key provided in a unit of a quantum key length in a quantum cryptography communication network.

2. Description of the Prior Art

Quantum cryptography communication may provide communication safe from a wiretapper by utilizing a quantum mechanical property of quanta (quantum) for communication.

In such quantum cryptography communication, a quantum key distribution (QKD) technology may distribute quantum information among users so that the users may share and use the same as a key for data encryption.

To this end, a quantum cryptography communication network that utilizes the quantum key distribution (QKD) technology includes a quantum key distribution layer that distributes a quantum key so that a neighboring node pair shares the same, a key management layer that receives a quantum key stream transferred from the quantum key distribution layer and stores and relays the same, and a service layer that receives a key transferred from the key management layer and applies the same to network service encryption.

A key management (KM) node in the key management layer divides, into predetermined size (length) units, a quantum key stream transferred from a quantum key distribution (QKD) node, and may store the same in a quantum key pool of each key management (KM) node.

Based on the same, each key management (KM) node of the key management layer may transfer a service key in response to a request from a service node of the service layer connected to the corresponding key management (KM) node, and the corresponding service key may be utilized as an encryption key for a communication service provided in the service node.

There may be various sizes of service data that need encryption in the service layer.

Therefore, in case that the key management (KM) node of the key management layer divides a quantum key stream into the same lengths and stores the same, a quantum key resource may be wasted such as the case in which a long quantum key is unnecessarily consumed for significantly small data, or the like.

Particularly, key combination in consideration of the length of a quantum key is required in the key management layer that configures an end-to-end long-distance quantum key by combining neighboring short-distance quantum keys.

SUMMARY OF THE INVENTION

The present disclosure has been made inconsideration of the above-mentioned problems and an aspect of the present disclosure is to adaptively manage and operate, according to a network condition, a multi-class quantum key provided in a unit of a quantum key length in a quantum cryptography communication network.

A quantum key management apparatus according to an embodiment of the present disclosure to achieve the above-described aspect may include a determination unit configured to determine the number of classes corresponding to classification of a quantum key shared in a key management (KM) node pair of a key management layer, and a length of a quantum key classified for each class, and an allocation unit configured to perform allocation by dividing an input quantum key stream by the length of a quantum key for each class in case that the quantum key stream is input, which is shared with neighboring quantum key distribution (QKD) nodes of a quantum key distribution layer.

Specifically, the apparatus may further include an updating unit configured to select an end-to-end key management node pair for each class, and, in case that a median node is present between a source node and a destination node in association with the selected end-to-end key management node pair, to relay a quantum key between the source node and the median node and a quantum key between the median node and the destination node so as to reproduce a quantum key.

Specifically, based on a service incidence rate of a service layer and a quantum key production rate of a quantum key distribution layer, the determination unit may determine the number of classes that satisfy a condition that the number of quantum keys for each class be greater than or equal to a threshold value.

Specifically, the determination unit may match classes to the distribution of the sizes of service data that requires encryption in a service layer, and may differently determine a length of a quantum key for each class by using the number of quantum bits needed for encrypting service data in the distribution of the sizes matched.

Specifically, based on a present condition of a quantum key for each class shared in a key management node pair, the allocation unit may allocate a quantum key to a predetermined class having a smallest number of quantum keys.

Specifically, based on the number of quantum keys between the source node and the median node and the number of quantum keys between the source node and the destination node, the updating unit may select an end-to-end key management node pair capable of maximizing a difference between the number of quantum keys between the median node and the destination node and the number of quantum keys between the source node and the destination node.

A quantum key management method performed in a quantum key management apparatus according to an embodiment of the present disclosure to achieve the above-described aspect may include a determination operation that determines the number of classes corresponding to classification of a quantum key shared in a key management (KM) node pair of a key management layer, and a length of a quantum key classified for each class, and an allocation operation that performs allocation by dividing an input quantum key stream by the length of a quantum key for each class in case that the quantum key stream is input, which is shared with neighboring quantum key distribution (QKD) nodes of a quantum key distribution layer.

Specifically, the method may further include an updating operation that selects an end-to-end key management node pair for each class, and, in case that a median node is present between a source node and a destination node in association with the selected end-to-end key management node pair, relays a quantum key between the source node and the median node and a quantum key between the median node and the destination node so as to reproduce a quantum key.

Specifically, based on a service incidence rate of a service layer and a quantum key production rate of a quantum key distribution layer, the determination operation may determine the number of classes that satisfy a condition that the number of quantum keys for each class be greater than or equal to a threshold value.

Specifically, the determination operation may match classes to the distribution of the sizes of service data that requires encryption in a service layer, and may differently determine a length of a quantum key for each class by using the number of quantum bits needed for encrypting service data in the distribution of sizes matched.

Specifically, based on a present condition of a quantum key for each class shared in a key management node pair, the allocation operation may allocate a quantum key to a predetermined class having a smallest number of quantum keys.

Specifically, based on the number of quantum keys between the source node and the median node and the number of quantum keys between the source node and the destination node, the updating operation may select an end-to-end key management node pair capable of maximizing a difference between the number of quantum keys between the median node and the destination node and the number of quantum keys between the source node and the destination node.

Accordingly, a quantum key management apparatus and a quantum key management method of the present disclosure adaptively manage and operate, according to a network condition, a multi-class quantum key provided in a unit of a quantum key length in a quantum cryptography communication network, thereby improving the efficiency of resources in the quantum cryptography communication network.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described with reference to the accompanying drawings.

An embodiment of the present disclosure describes technology related to a quantum cryptography communication that provides communication safe from a wiretapper by utilizing a quantum mechanical property of quantum for communication.

In the quantum cryptography communication, a quantum key distribution (QKD) technology may distribute quantum information to users so that the users share and use the same as a key for data encryption.

Figure 1:
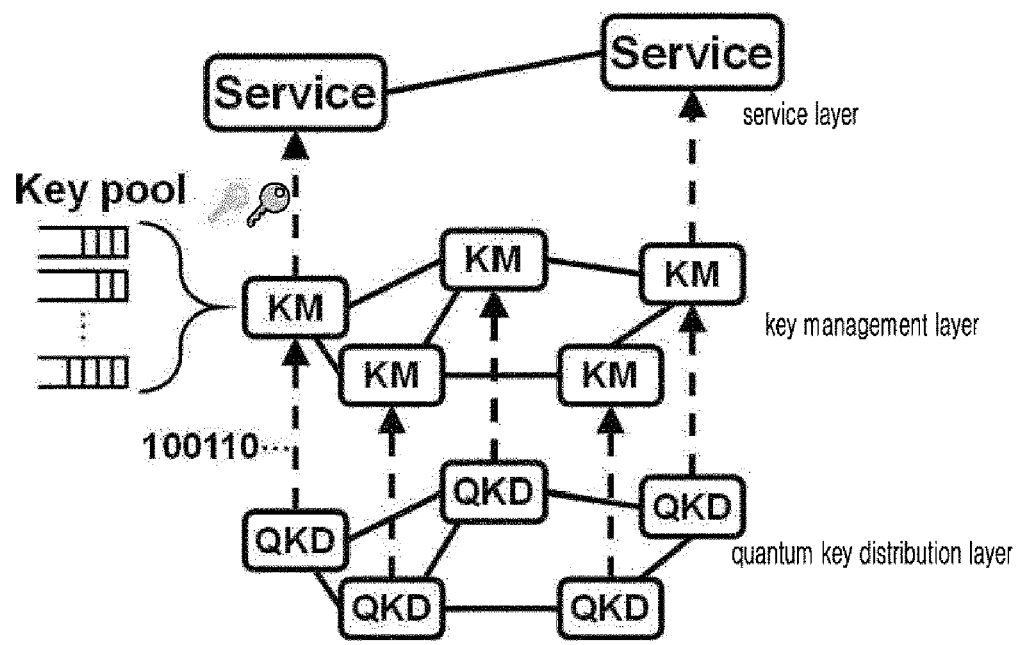
FIG. 1 is a diagram illustrating a quantum cryptography communication network according to an embodiment of the present disclosure.

In association with the above, FIG. 1 illustrates an example of a quantum cryptography communication network according to an embodiment of the present disclosure.

As illustrated in FIG. 1, a quantum cryptography communication network according to an embodiment of the present disclosure may include a quantum key distribution layer that distributes a quantum key so that a neighboring node pair shares the same, a key management layer that receives a quantum key stream transferred from the quantum key distribution layer and stores and relays the same, and a service layer that receives a key transferred from the key management layer and applies the same to network service encryption.

The quantum key distribution layer may include quantum key distribution (QKD) nodes and a link that connects quantum key distribution (QKD) nodes.

As described above, a pair of two quantum key distribution (QKD) nodes connected to each other via a link may distribute and share quantum information via the quantum key distribution technology, and the shared quantum information may be converted into digital information, and may be transferred to a key management (key manager (KM)) node of the key management layer.

Each quantum key distribution (QKD) node may be connected to a corresponding (same index) key management (KM) node, and quantum key information may be transferred therethrough.

In association with the same, a key management (KM) node and a quantum key distribution (QKD) node may be layered in the same server rack and may be connected to each other via a short interface.

A key management (KM) node in the key management layer divides, into predetermined size (length) units, a quantum key stream transferred from a quantum key distribution (QKD) node, and may store the same in a quantum key pool of each key management (KM) node.

Based on the same, each key management (KM) node of the key management layer may transfer a service key in response to a request from a service node of the service layer connected to the corresponding key management (KM) node, and the corresponding service key may be utilized as an encryption key for a communication service provided in the service node.

There are various sizes of service data that need encryption in the service layer.

Therefore, in case that the key management (KM) node of the key management layer divides a quantum key stream into the same lengths and stores the same, a quantum key resource may be wasted such as the case in which a long quantum key is unnecessarily consumed for significantly small data, or the like.

Particularly, key combination in consideration of the length of a quantum key is required in the key management layer that configures an end-to-end long-distance quantum key by combining neighboring short-distance quantum keys.

As described above, service data that needs encryption may be produced in various sizes in the service layer, and thus to configure a quantum key consumed for encrypting data in various sizes (lengths) based thereon may be essential to efficiently consume a quantum resource and to improve the performance of a quantum cryptography communication network.

Therefore, key management (KM) nodes in the key management layer according to an embodiment of the present disclosure may configure and store quantum keys having various lengths according to a network environment.

Figure 2:
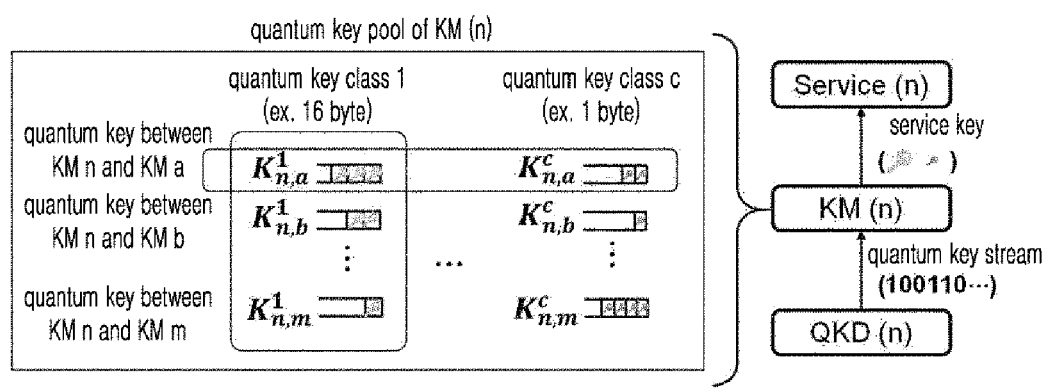
FIG. 2 is a diagram illustrating a quantum key management scheme according to an embodiment of the present disclosure.

In association with the above, FIG. 2 illustrates an example of a quantum key management scheme according to an embodiment of the present disclosure.

FIG. 2 assumes that quantum cryptography communication network component elements are indexed, and illustrates a node including an nth quantum key distribution (QKD) node (QKD (n)), an nth key management (KM) node (KM (n)), and an nth service node (service (n)).

In the above-described example, the QKD (n) transfers a quantum key stream shared with neighboring key distribution (QKD) nodes to the KM (n), and the KM(n) divides the quantum key stream transferred from the QKD (n) into keys having a total of c lengths, and save the same in a key pool (quantum key pool).

In an embodiment of the present disclosure, keys having the same length are defined as keys in the same class, and the key management (KM) nodes of a key management layer are assumed as being indexed from a to m.

In addition, according to an embodiment of the present disclosure, $K_{n,a}^i$ denotes a set of class i shared between key management (KM) node n and key management (KM) node a, and Ki(n,a) denotes the number of quantum keys in class i shared between the key management (KM) node n and the key management (KM) node a.

That is, Ki(n,a) may be calculated as $|K_{n,a}^i|$.

Therefore, a key pool (quantum key pool) of the key management (KM) node n is a device that stores as much quantum information as a total of c classes that the corresponding key management (KM) node n shares with all other key management (KM) nodes in the key management layer.

For reference, although the example described with reference to FIG. 2 illustrates a two-dimensional quantum key storage structure for ease of description, the embodiment of the present disclosure is not limited thereto. In addition, although quantum keys in class 1 are described as a set of quantum keys having a length of 16 bytes and quantum keys in class c are described as a set of quantum keys having a length of 1 byte, the present disclosure is also not limited thereto.

On the above-described assumption, in the quantum cryptography communication network according to an embodiment of the present disclosure, a multi-class quantum key provided in a unit of a quantum key length may be adaptively managed and operated according to a network condition. Hereinafter, the configuration of a quantum key management apparatus (not illustrated) for implementing the same will be described.

Here, although a quantum key management apparatus (not illustrated) may be a configuration of a separate controller (e.g., Q controller) that manages and operates a key management (KM) node located in the key management layer, it is not limited thereto. The quantum key management apparatus may be a node designated as a master node among key management (KM) nodes located in the key management layer, or may correspond to each key management (KM) node.

Figure 3:
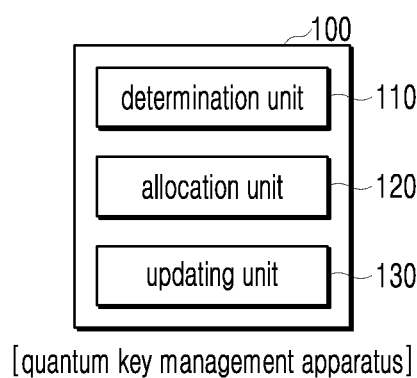
FIG. 3 is a block diagram illustrating a quantum key management apparatus according to an embodiment of the present disclosure.

In association with the above, FIG. 3 illustrates a configuration of a quantum key management apparatus 100 according to an embodiment of the present disclosure.

As illustrated in FIG. 3, the quantum key management apparatus 100 according to an embodiment of the present disclosure may be configured with a determination unit 110 that determines information associated with a class, and an allocation unit 120 that allocates a quantum key.

Furthermore, in addition to the above-described configuration, the quantum key management apparatus 100 according to an embodiment may be further configured with an updating unit 130 that reproduces a quantum key.

The whole or at least a part of the configuration of the quantum key management apparatus 100 including the above-described determination unit 110, the allocation unit 120, and the updating unit 130 may be embodied in the form of a hardware module or in the form of a software module, or may be embodied in the form of a combination of a hardware module and a software module.

Here, the software module may be considered as, for example, an instruction executed by a processor that controls an operation in the quantum key management apparatus 100, and such an instruction may be in the form of being contained in memory in the quantum key management apparatus 100.

The quantum key management apparatus 100 according to an embodiment of the present disclosure may adaptively manage and operate, according to a network condition, a multi-class quantum key provided in a unit of a quantum key length by using the above-described configuration. Hereinafter, a detailed description of an internal configuration of the quantum key management apparatus 100 to implement the same will be described.

The determination unit 110 may be in charge of a function of determining information related to a class.

More specifically, the determination unit 110 may determine the number of classes corresponding to classification of a quantum key shared in key management (KM) node pair of a key management layer.

In this instance, based on a service incidence rate of a service layer and a quantum key production rate of a quantum key distribution layer, the determination unit 110 may determine the number of classes that satisfy a condition that the number of quantum keys for each class be greater than or equal to a threshold value.

For example, a service incidence rate and a quantum key production rate in the future may be expected based on a service incidence rate and a quantum key production rate in the past by utilizing a method such as a machine learning or the like. Based on the expected incidence rate and production rate, the number of classes may be defined by selecting one of the numbers of classes that satisfy a condition that all quantum keys of all key management (KM) nodes in the key management layer be greater than or equal to a threshold value.

That is, according to the condition of i<c, c that satisfies Equation 1 below may be defined as the total number of quantum key classes of the system. Here, it is apparent that a threshold value (Thr1) is dynamically and variously selectable according to a network condition.

$$\min_{n,m,i} K^i(n, m) > Thr_1 \qquad \text{[Equation 1]}$$

In addition, in case that the number of classes for a quantum key shared in a key management (KM) node pair of the key management layer is determined, the determination unit 110 may determine the length of a quantum key for each class.

In this instance, the determination unit 110 may match classes to the distribution of the sizes of service data that needs encryption in the service layer, and may differently determine the length of a quantum key for each class according to the number of quantum bits needed for encrypting the service data in the distribution of the sizes matched.

For example, the length of a quantum key of class 1 may be defined as a length needed for encrypting data having a size greater than or equal to top a % in the distribution of the sizes of quantum cryptography communication service data, and the length of a quantum key of class 2 may be defined as a length needed for encrypting data having a size greater than or equal to top b % and less than a % in the distribution of the sizes of object data for quantum cryptography communication service (a<b).

Lastly, the length of a quantum key of class c may be defined as a length needed for encrypting data having a size less than or equal to the bottom x % in the distribution of the sizes of quantum cryptography communication service data.

As described above, according to an embodiment of the present disclosure, by determining the length of a quantum key for each class in consideration of the distribution of the sizes of object data for service, a quantum key in a class that is optimized for the size of quantum cryptography communication service data may be allocable, and thus a quantum resource may be efficiently utilized.

The allocation unit 120 may be in charge of a function of dividing a quantum key stream and allocating the same to classes.

More specifically, in case that a quantum key stream shared with neighboring quantum key distribution (QKD) nodes in the quantum key distribution layer is input to a key management (KM) node, the allocation unit 120 may divide the input quantum key stream by the length of a quantum key for each class, and may perform allocation.

In this instance, based on the present condition of a quantum key for each class shared in a key management (KM) node pair, the allocation unit 120 may allocate a quantum key to a predetermined class having the smallest number of quantum keys.

According to an embodiment of the present disclosure, after the number of classes corresponding to quantum key classification and the length of each class are defined, a key management (KM) node in the key management layer may store, in an appropriate class, a quantum key stream input in real time from a quantum key distribution (QKD) node of the quantum key distribution layer, and may manage the same.

Accordingly, for allocating a quantum key to each class shared between key management (KM) nodes n and m, a service incidence rate between service nodes n and m, a quantum key production rate between quantum key distribution (QKD) nodes n and m, the present condition of a quantum key between the key management (KM) nodes n and m, and the like are all taken into consideration.

For example, a quantum key stream shared between the quantum key distribution (QKD) nodes n and m is input to the key management (KM) node n, the key management (KM) node n may divide the corresponding quantum key stream by a length corresponding to class (i*) that satisfies Equation 2 given below, and may store the same in a key pool $K_{n,m}^{i*}$.

$$i^* = \operatorname*{argmin}_{i} K^i(n, m) \qquad \text{[Equation 2]}$$

The above equation is an example of a scheme of allocating (storing) a quantum key to a class currently having the smallest number of quantum keys among quantum keys of all classes shared between key management (KM) nodes, and the disclosure is not limited thereto.

The updating unit 130 may be in charge of a function of relaying and reproducing a quantum key.

More specifically, the updating unit 130 may select an end-to-end key management (KM) node pair for each class, and in case that a median node is present between a source node and a destination node in association with the selected end-to-end key management (KM) node pair, the updating unit 130 may relay a quantum key between the source node and the median node and a quantum key between the median node and the destination node, and may reproduce a quantum key.

In this instance, based on the number of quantum keys between the source node and the median node and the number of quantum keys between the source node and the destination node, the updating unit 130 may select an end-to-end key management (KM) node pair that maximizes the difference between the number of quantum keys between the median node and the destination node and the number of quantum keys between the source node and the destination node.

According to an embodiment of the present disclosure, in the case of a quantum key distribution technology, the distance between two quantum key distribution (QKD) nodes in a pair that is connected via a link may be restricted due to technical limitation.

Therefore, a method of relaying a plurality of quantum keys may be utilized in order to produce along-distance end-to-end quantum key for an actual quantum cryptography communication service.

For example, in case that quantum key distribution (QKD) nodes a and b are connected to each other, and quantum key distribution (QKD) nodes b and c are connected to each other, there may be used a method of relaying one of the quantum keys between the quantum key distribution (QKD) nodes a and b and one of the quantum keys between the QKD nodes b and c, and reproducing an end-to-end key between the node a and the node c.

In this instance, quantum key relaying may be performed between the key management (KM) nodes of the key management layer.

In association with the above, an embodiment of the present disclosure proposes a multi-class based quantum key relay algorithm for producing a long-distance end-to-end quantum key.

Figure 4:
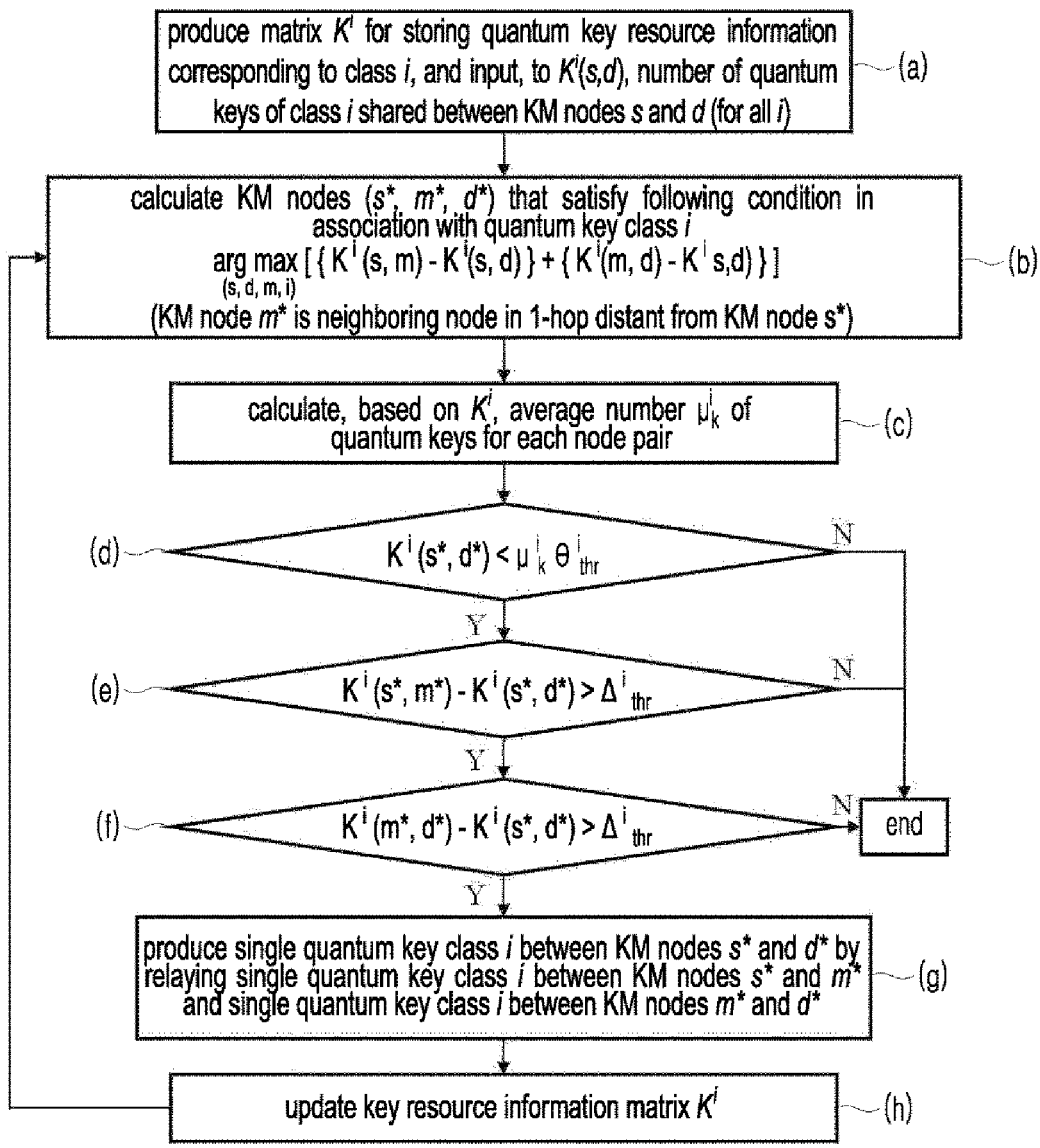
FIG. 4 is a diagram illustrating a multi-class based quantum key relay algorithm according to an embodiment of the present disclosure.

FIG. 4 is a diagram illustrating a multi-class based quantum key relay algorithm according to an embodiment of the present disclosure.

As illustrated in FIG. 4, according to the multi-class based quantum key relay algorithm according to an embodiment of the present disclosure, a quantum key resource information storage matrix (K) indicating the current number of quantum keys of each class may be produced for each class in association with quantum keys of all classes in operation a.

In this instance, the current number of quantum keys of class i may be stored in matrix Ki, and the number of quantum keys of class i shared between two key management (KM) nodes in a pair may be stored in matrix Ki.

For example, the number of quantum keys of class i shared between key management (KM) nodes s and d may be stored in Ki(s,d).

A quantum key relay in the key management layer may need to consume and relay quantum keys shared in a neighboring key management (KM) node pair, so as to reproduce a quantum key for an end-to-end key management (KM) node pair.

To this end, in the quantum key relay algorithm according to an embodiment of the present disclosure, key management (KM) nodes s*(source node), m*(median node), and d*(destination node), and i*(class) that satisfy Equation 3 given below may be selected in operation b.

$$\underset{(s,d,m,i)}{\arg\max}\left[\{K^i(s,m) - K^i(s,d)\} + \{K^i(m,d) - K^i(s,d)\}\right] \quad \text{[Equation 3]}$$

For reference, as an example of reducing the complexity of calculation of an equation, the key management (KM) node m* may be limited to a neighboring node in a 1 hop distance from the key management (KM) node s*.

According to a multi-class based quantum key relay algorithm of the present disclosure, a single quantum key between the key management (KM) nodes s* and m* and a single quantum key between the KM nodes m* and d* that are calculated via the algorithm may be consumed as a relay, and a single quantum key between the KM nodes s* and d* may be produced.

Therefore, Equation 3 given above may take into consideration of the difference between the number of quantum keys between the key management (KM) nodes s and m and the number of quantum keys between the key management (KM) nodes s and d, and may take into consideration of the difference between the number of quantum keys between key management (KM) nodes m and d and the number of quantum keys between key management (KM) nodes s and d, so as to select key management (KM) nodes s*, d*, and m* that maximize the differences.

That is, key management (KM) nodes that consume a plurality of quantum keys (key management (KM) nodes s* and m* and key management (KM) node m* and d*) via a quantum key relay, and reproduce a small number of quantum keys (key management (KM) node *s and *d) via a quantum key relay may be selected.

Subsequently, the multi-class based quantum key relay algorithm according to an embodiment of the present disclosure may calculate the average number $\mu_k^i$ of quantum keys for each key management (KM) node pair of each class in operation c.

As a condition for terminating the multi-class based quantum key relay algorithm of the present disclosure, in case that the number (Ki(s*,d*)) of quantum keys in class i between key management (KM) node s* and d* selected via Equation 3 is not less than the product of the average number $\mu_k^i$ of quantum keys for each key management (KM) node pair for class i and a threshold value $\theta_{thr}^i$ the algorithm may be terminated in operation d.

Here, the threshold value $\theta_{thr}^i$ may be configured to be different for each quantum key class, and may be flexibly selected based on a quantum cryptography communication service incidence rate, the current number of quantum keys, a quantum key production rate, and the like.

In case that the difference between Ki(s*,m*) and Ki(s*,d*) is not greater than a threshold value $\Delta_{thr}^i$, the algorithm may be terminated in operation d. Similarly, in case that the difference between Ki(m*,d*) and Ki(s*,d*) is not greater than a threshold value $\Delta_{thr}^i$, the algorithm may also be terminated in operation e.

Here, the threshold value $\Delta_{thr}^i$ may be configured to be different for each quantum key class, and may be flexibly selected based on a quantum cryptography communication service incidence rate, the current number of quantum keys, a quantum key production rate, and the like.

Furthermore, in case that all of the above-described conditions for terminating the algorithm are not satisfied, the multi-class based quantum key relay algorithm according to an embodiment of the present disclosure may consume, as a single relay, a single quantum key of class i between the key management (KM) nodes s* and m* and a single quantum key of class i between the key management (KM) nodes m* and d*, and may produce a single quantum key of class i between the key management (KM) nodes s* and d* in operation g.

Subsequently, the multi-class based quantum key relay algorithm according to an embodiment of the present disclosure may update the key resource information matrix with information associated with the changed number of quantum keys, and may repeat, based on the changed key resource information matrix, the above-described processes in order to select new key management (KM) nodes s*, m*, d* and class i*.

As described above, according to the configuration of the quantum key management apparatus 100 according to an embodiment of the present disclosure, quantum keys configured with quantum bits may be capable of being stored in multiple classes, managed, and relayed in order to perform efficient encryption of service data having different data sizes, and thus a quantum cryptography communication service that maximally and efficiently utilizes a limited amount of resources may be achieved.

Figure 5:
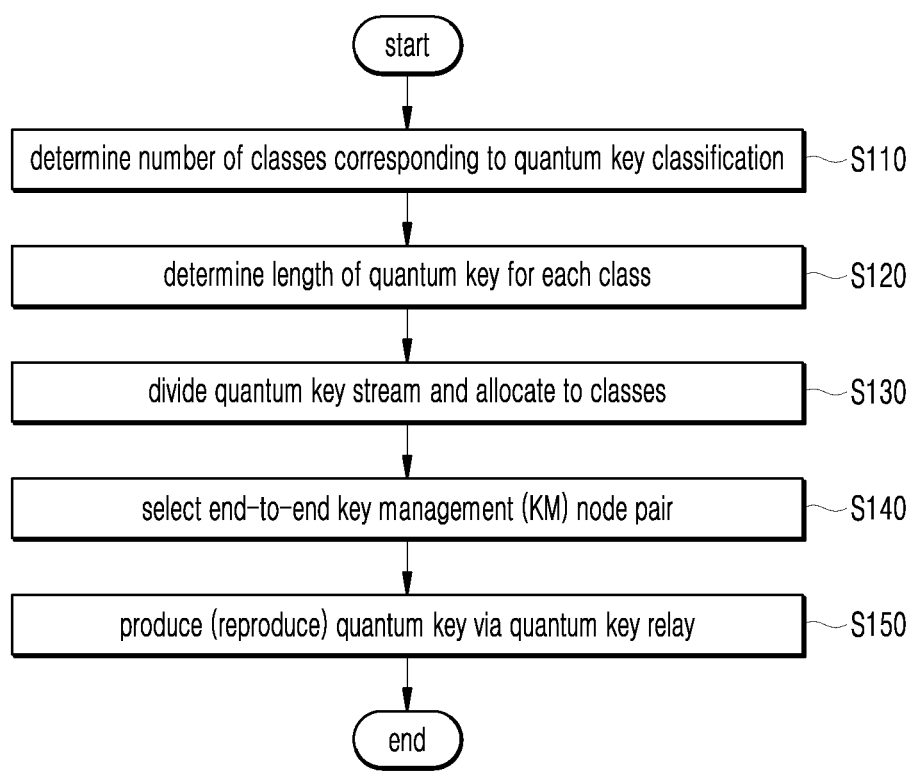
FIG. 5 is a flowchart illustrating a quantum key management method according to an embodiment of the present disclosure.

Hereinafter, a quantum key management method according to an embodiment of the present disclosure is described with reference to FIG. 5.

A subject that operates the quantum key management method according to an embodiment of the present disclosure is the quantum key management apparatus 100. Accordingly, hereinafter, a description is provided with reference to the corresponding reference numeral.

First, the quantum key management apparatus 100 may determine the number of classes corresponding to classification of a quantum key shared in key management (KM) node pair of a key management layer in operation S110.

In this instance, based on a service incidence rate of a service layer and a quantum key production rate of a quantum key distribution layer, the quantum key management apparatus 100 may determine the number of classes that satisfy a condition that the number of quantum keys for each class be greater than or equal to a threshold value.

For example, a service incidence rate and a quantum key production rate in the future may be expected based on a service incidence rate and a quantum key production rate in the past by utilizing a method such as a machine learning or the like. Based on the expected incidence rate and production rate, the number of classes may be defined by selecting one of the numbers of classes that satisfy a condition in which all quantum keys of all key management (KM) nodes in the key management layer be greater than or equal to a threshold value.

That is, under the condition of i<c, c that satisfies Equation 1 mentioned above may be defined as the total number of quantum key classes of the system. Here, it is apparent that a threshold value (Thr1) is dynamically and variously selectable according to a network condition.

In addition, in case that the number of classes for a quantum key shared in a key management (KM) node pair in the key management layer is determined, the quantum key management apparatus 100 may determine the length of a quantum key for each class in operation S120.

In this instance, the quantum key management unit 100 may match classes to the distribution of the sizes of service data that needs encryption in the service layer, and may differently determine the length of a quantum key for each class according to the number of quantum bits needed for encrypting the service data in the distribution of the sizes matched.

For example, the length of a quantum key of class 1 may be defined as a length needed for encrypting data having a size greater than or equal to top a % in the distribution of the sizes of quantum cryptography communication service data, and the length of a quantum key of class 2 may be defined as a length needed for encrypting data having a size greater than or equal to top b % and less than a % in the distribution of the sizes of object data for the quantum cryptography communication service (a<b).

Lastly, the length of a quantum key of class c may be defined as a length needed for encrypting data having a size less than or equal to the bottom x % in the distribution of the sizes of quantum cryptography communication service data.

As described above, according to an embodiment of the present disclosure, by determining the length of a quantum key for each class in consideration of the distribution of the sizes of object data for a service, a quantum key of a class that is optimized for the size of quantum cryptography communication service data may be allocable, and thus a quantum resource may be efficiently utilized.

More specifically, in case that a quantum key stream shared with neighboring quantum key distribution (QKD) nodes of the quantum key distribution layer is input to a key management (KM) node, the quantum key management apparatus 100 may divide the input quantum key stream by the length of a quantum key for each class, and may perform allocation in operation S130.

In this instance, based on the present condition of a quantum key for each class shared in a key management (KM) node pair, the quantum key management apparatus 100 may allocate a quantum key to a predetermined class having the smallest number of quantum keys.

According to an embodiment of the present disclosure, after the number of classes corresponding to quantum key classification and the length of each class are defined, a key management (KM) node in the key management layer may need to store, in an appropriate class, a quantum key stream input in real time from a quantum key distribution (QKD) node of the quantum key distribution layer, and may manage the same.

Accordingly, for allocating a quantum key to each class shared between key management (KM) nodes n and m, a service incidence rate between service nodes n and m, a quantum key production rate between quantum key distribution (QKD) nodes n and m, the present condition of a quantum key between key management (KM) nodes n and m, and the like are all taken into consideration.

For example, a quantum key stream shared between the quantum key distribution (QKD) nodes n and m is input to the key management (KM) node n, the key management (KM) node n may divide the corresponding quantum key stream by a length corresponding to class (i*) that satisfies Equation 2 given above, and may store the same in a key pool $K_{n,m}^{i*}$.

Subsequently, the quantum key management apparatus 100 may select an end-to-end key management (KM) node pair for each class, and in case that a median node is present between a source node and a destination node in association with the selected end-to-end key management (KM) node pair, the quantum key management apparatus 100 may relay a quantum key between the source node and the median node and a quantum key between the median node and the destination node, and may reproduce a quantum key in operations S140 and S150.

In this instance, based on the number of quantum keys between the source node and the median node and the number of quantum keys between the source node and the destination node, the quantum key management apparatus 100 may select an end-to-end key management (KM) node pair that maximizes the difference between the number of quantum keys between the median node and the destination node and the number of quantum keys between the source node and the destination node.

According to an embodiment of the present disclosure, in the case of a quantum key distribution technology, the distance between two quantum key distribution (QKD) nodes in a pair that is connected via a link may be restricted due to technical limitation.

Therefore, a method of relaying a plurality of quantum keys may be utilized in order to produce along-distance end-to-end quantum key for an actual quantum cryptography communication service.

For example, in case that quantum key distribution (QKD) nodes a and b are connected to each other, and quantum key distribution (QKD) nodes b and c are connected to each other, there may be used a method of relaying one of the quantum keys between the quantum key distribution (QKD) nodes a and b and one of the quantum keys between the QKD nodes b and c and reproducing an end-to-end key between the node a and the node c.

In this instance, quantum key relaying may be performed between the key management (KM) nodes of the key management layer.

In association with the above, an embodiment of the present disclosure proposes a multi-class based quantum key relay algorithm for producing a long-distance end-to-end quantum key.

As illustrated in FIG. 4, according to the multi-class based quantum key relay algorithm according to an embodiment of the present disclosure, a quantum key resource information storage matrix (K) indicating the current number of quantum keys of each class in association with quantum keys of all classes may be produced for each class in operation a.

In this instance, the current number of quantum keys of class i may be stored in matrix Ki, and the number of quantum keys of class i shared between two key management (KM) nodes in a pair may be stored in the matrix Ki.

For example, the number of quantum keys of class i shared between key management (KM) nodes s and d may be stored in Ki(s,d).

A quantum key relay in the key management layer may need to consume and relay quantum keys shared in a neighboring key management (KM) node pair, so as to reproduce a quantum key for an end-to-end key management (KM) node pair.

To this end, in a quantum key relay algorithm according to an embodiment of the present disclosure may select key management (KM) nodes s*(source node), m*(median node), and d*(destination node), and i*(class) that satisfy Equation 3 given below in operation b.

For reference, as an example of reducing the complexity of calculation of an equation, the key management (KM) node m* may be limited to a neighboring node in a 1 hop distance from the key management (KM) node s*.

According to the multi-class based quantum key relay algorithm of the present disclosure, a single quantum key between the key management (KM) nodes s* and m* and a single quantum key between the KM nodes m* and d* that are calculated via the algorithm may be consumed as a single relay and a single quantum key between the KM nodes s* and d* may be produced.

Therefore, the quantum key relay algorithm according to an embodiment of the present disclosure may take into consideration of the difference between the number of quantum keys between the key management (KM) nodes s and m and the number of quantum keys between the key management (KM) nodes s and d, and may take into consideration of the difference between the number of quantum keys between key management (KM) nodes m and d and the number of quantum keys between key management (KM) nodes s and d, so as to select key management (KM) nodes s*, d*, and m* that maximize the differences.

That is, key management (KM) nodes that consume a plurality of quantum keys (key management (KM) nodes s* and m* and key management (KM) node m* and d*) via a quantum key relay, and reproduces a small number of quantum keys (key management (KM) node *s and *d) via a quantum key relay may be selected.

Subsequently, the multi-class based quantum key relay algorithm according to an embodiment of the present disclosure may calculate the average number of quantum keys $\mu_k^i$ for each key management (KM) node pair of each class in operation c.

As a condition for terminating the multi-class based quantum key relay algorithm of the present disclosure, in case that the number (Ki(s*,d*)) of quantum keys of class i between key management (KM) node s* and d* selected via Equation 3 is not less than a product between the average number $\mu_k^i$ of quantum keys for each key management (KM) node pair for class i and threshold value $\theta_{thr}^i$, the algorithm may be terminated in operation d.

Here, the threshold value $\theta_{thr}^i$ may be configured to be different for each quantum key class, and may be flexibly selected based on a quantum cryptography communication service incidence rate, the current number of quantum keys, a quantum key production rate, and the like.

In case that the difference between Ki(s*,m*) and Ki(s*, d*) is not greater than a threshold value $\Delta_{thr}^i$, the algorithm may be terminated in operation d. Similarly, in case that the difference between Ki(m*,d*) and Ki(s*,d*) is not greater than a threshold value $\Delta_{thr}^i$, the algorithm may also be terminated in operation e.

Here, the threshold value $\Delta_{thr}^i$ may be configured to be different for each quantum key class, and may be flexibly selected based on a quantum cryptography communication service incidence rate, the current number of quantum keys, a quantum key production rate, and the like.

Furthermore, in case that all the above-described conditions for terminating the algorithm are not satisfied, the multi-class based quantum key relay algorithm according to an embodiment of the present disclosure may consume a single quantum key of class i between the key management (KM) nodes s* and m* and a single quantum key of class i between the key management (KM) nodes m* and d* as a single relay, and may produce a single quantum key of class i between the key management (KM) nodes s* and d* in operation g.

Subsequently, the multi-class based quantum key relay algorithm according to an embodiment of the present disclosure may update the key resource information matrix with information associated with the changed number of quantum keys, and may repeat, based on the changed key resource information matrix, the above-described processes in order to select new key management (KM) nodes s*, m*, d* and class i* in operation h.

As described above, according to the quantum key management method of an embodiment of the present disclosure, quantum keys configured with quantum bits may be capable of being stored in multiple classes, managed, and relayed in order to perform efficient encryption of service data having different data sizes, and thus a quantum cryptography communication service that maximally and efficiently utilizes a limited amount of resources may be achieved.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) may be written in any form of programming language, including compiled or interpreted languages, declarative or procedural languages, and it may be deployed in any form, including as a stand-alone program or module, a component, subroutine, or another unit suitable for use in a computer environment. A computer program may, but need not, correspond to a file in a file system. A program may be stored in a single file provided to the requested program, in multiple coordinated files (for example, files that store one or more modules, sub-programs, or portions of code), or in a portion of a file that holds other programs or data (for example, one or more scripts stored in a markup language document). A computer program may be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, those skilled in the art may modify, change, and transform some parts without departing a scope of the present disclosure. The scope of the present disclosure is defined by the appended claims as described below, rather than the above detailed description. Accordingly, it should be understood that all modifications or variations derived from the meaning and scope of the appended claims and equivalents thereof fall within the scope of the present disclosure.

INDUSTRIAL APPLICABILITY

From the perspective that a quantum cryptography communication network is capable of managing and operating a multi-class quantum key provided in a unit of a quantum key length according to a quantum key management apparatus and a quantum key management method of the present disclosure, the method and apparatus are beyond the limits of existing technology, and thus a related technology is capable of being used, and an apparatus to which the related technology is applied has a sufficient possibility of coming on the market or being on sale, and is actually and apparently implementable. Accordingly, the disclosure has industrial applicability.

What is claimed is:

1. A quantum key management apparatus comprising:
   a non-transitory computer-readable recording medium that stores instructions; and
   a processor that implements one or more of the instructions to:
   determine a number of classes corresponding to classification of a quantum key shared in a key management (KM) node pair of a key management layer, and a length of a quantum key classified for each class; and
   perform allocation by dividing an input quantum key stream by the length of a quantum key for each class in case that the quantum key stream shared with neighboring quantum key distribution (QKD) nodes of a quantum key distribution layer is input to a key management node,
   wherein the processor when determining the number of classes is further to determine, based on a service incidence rate of a service layer and a quantum key production rate of a quantum key distribution layer, the number of classes that satisfy a condition that the number of quantum keys for each class be greater than or equal to a threshold value.

2. The quantum key management apparatus of claim 1, wherein the processor when implementing the one or more instructions is further to select an end-to-end key management node pair for each class, and, in case that a median node is present between a source node and a destination node in association with the selected end-to-end key management node pair, to relay a quantum key between the source node and the median node and a quantum key between the median node and the destination node so as to reproduce a quantum key.

3. The quantum key management apparatus of claim 1, wherein the processor, when determining the number of classes, further matches classes to a distribution of sizes of service data that requires encryption in a service layer, and differently determines a length of a quantum key for each class by using the number of quantum bits needed for encrypting service data in the distribution of the sizes matched.

4. The quantum key management apparatus of claim 1, wherein the processor, when performing the allocation, is further to, based on a present condition of a quantum key for each class shared in a key management node pair, allocate a quantum key to a predetermined class having a smallest number of quantum keys.

5. A quantum key management apparatus comprising:
   a non-transitory computer-readable recording medium that stores instructions; and
   a processor that implements one or more of the instructions to:
   determine a number of classes corresponding to classification of a quantum key shared in a key management (KM) node pair of a key management layer, and a length of a quantum key classified for each class;
   perform allocation by dividing an input quantum key stream by the length of a quantum key for each class in case that the quantum key stream shared with neighboring quantum key distribution (QKD) nodes of a quantum key distribution layer is input to a key management node; and select an end-to-end key management node pair for each class, and, in case that a median node is present between a source node and a destination node in association with the selected end-to-end key management node pair, to relay a quantum key between the source node and the median node and a quantum key between the median node and the destination node so as to reproduce a quantum key, wherein the processor selects, based on the number of quantum keys between the source node and the median node and the number of quantum keys between the source node and the destination node, an end-to-end key management node pair capable of maximizing a difference between the number of quantum keys between the median node and the destination node and the number of quantum keys between the source node and the destination node.

6. A quantum key management method performed in a quantum key management apparatus, the method comprising:

determining a number of classes corresponding to classification of a quantum key shared in a key management (KM) node pair of a key management layer, and a length of a quantum key classified for each class; and performing allocation by dividing an input quantum key stream by the length of a quantum key for each class in case that the quantum key stream shared with neighboring quantum key distribution (QKD) nodes of a quantum key distribution layer is input to a key management node, wherein determining the number of classes includes determining, based on a service incidence rate of a service layer and a quantum key production rate of a quantum key distribution layer the number of classes that satisfy a condition that the number of quantum keys for each class be greater than or equal to a threshold value.

7. The method of claim 6, further comprising:

selecting an end-to-end key management node pair for each class and, in case that a median node is present between a source node and a destination node in association with the selected end-to-end key management node pair, relaying a quantum key between the source node and the median node and a quantum key between the median node and the destination node so as to reproduce a quantum key.

8. The method of claim 6, wherein the determination determining the number of classes comprises:

matching classes to a distribution of sizes of service data that requires encryption in a service layer; and differently determining a length of a quantum key for each class by using the number of quantum bits needed for encrypting service data in the distribution of the sizes matched.

9. The method of claim 6, wherein performing the allocation comprises, based on a present condition of a quantum key for each class shared in a key management node pair, allocating a quantum key to a predetermined class having a smallest number of quantum keys.

10. A quantum key management method performed in a quantum key management apparatus, the method comprising:

determining a number of classes corresponding to classification of a quantum key shared in a key management (KM) node pair of a key management layer, and a length of a quantum key classified for each class; and performing allocation by dividing an input quantum key stream by the length of a quantum key for each class in case that the quantum key stream shared with neighboring quantum key distribution (QKD) nodes of a quantum key distribution layer is input to a key management node; and selecting an end-to-end key management node pair for each class and, in case that a median node is present between a source node and a destination node in association with the selected end-to-end key management node pair, relaying a quantum key between the source node and the median node and a quantum key between the median node and the destination node so as to reproduce a quantum key, wherein selecting the end-to-end key management node pair for each class comprises, based on the number of quantum keys between the source node and the median node and the number of quantum keys between the source node and the destination node, selecting an end-to-end key management node pair capable of maximizing a difference between the number of quantum keys between the median node and the destination node and the number of quantum keys between the source node and the destination node.

* * * * *